United States Patent
Li (10) Patent No.: US 11,960,098 B2
(45) Date of Patent: Apr. 16, 2024

(54) BEAM SHAPING METHOD AND DEVICE EMPLOYING FULL-IMAGE TRANSFER FOR PLANAR LIGHT SOURCES

(71) Applicant: SHANDONG XINYUAN PHOTOELECTRIC TECHNOLOGY CO., LTD, Linyi (CN)

(72) Inventor: Delong Li, Linyi (CN)

(73) Assignee: SHANDONG XINYUAN PHOTOELECTRIC TECHNOLOGY CO., LTD, Linyi (CN)

( * ) Notice: Subject to any disclaimer, the term of this patent is extended or adjusted under 35 U.S.C. 154(b) by 0 days.

(21) Appl. No.: 17/822,130

(22) Filed: Aug. 25, 2022

(65) Prior Publication Data

US 2022/0404632 A1 Dec. 22, 2022

Related U.S. Application Data

(63) Continuation of application No. PCT/CN2020/103101, filed on Jul. 20, 2020.

(30) Foreign Application Priority Data

Feb. 25, 2020 (CN) .......................... 202010116770.8
Feb. 25, 2020 (CN) .......................... 202020207056.5

(51) Int. Cl.
*G02B 27/09* (2006.01)
*F21V 5/00* (2018.01)
(Continued)

(52) U.S. Cl.
CPC .......... *G02B 27/0927* (2013.01); *F21V 5/007* (2013.01); *G02B 3/0056* (2013.01); *G02B 3/0062* (2013.01); *G02B 27/0922* (2013.01); *G02B 27/0961* (2013.01); *F21Y 2115/10* (2016.08); *F21Y 2115/30* (2016.08)

(58) Field of Classification Search
CPC . F21V 5/007; G02B 27/0922; G02B 27/0927; G02B 27/0961; G02B 3/0056; G02B 3/0062
See application file for complete search history.

(56) References Cited

U.S. PATENT DOCUMENTS

2015/0260830 A1* 9/2015 Ghosh .................... G01S 7/484
 250/208.1
2016/0377414 A1* 12/2016 Thuries .............. G02B 27/1093
 359/558

* cited by examiner

*Primary Examiner* — Evan P Dzierzynski
*Assistant Examiner* — Nathaniel J Lee
(74) *Attorney, Agent, or Firm* — George Guosheng Wang; Upstream Research and Patent LLC (57) ABSTRACT

A beam shaping method and device employing full-image transfer for planar light sources. The method comprises: using multiple first lenses to respectively magnify and image beams emitted by multiple planar light sources, so as to obtain magnified full images of the multiple planar light sources; and seamlessly stitching together the magnified full images of the multiple planar light sources at a primary imaging position, so as to obtain a seamless light source at the primary imaging position. The beam shaping method for the planar light sources achieves the elimination of gaps between the light sources with almost no loss of optical power by means of full-image transfer and seamless stitching, thereby improving the beam quality of the light sources as a whole. This kind of optical shaping method is suitable for shaping and processing planar light sources such as VCSEL and LED.

14 Claims, 4 Drawing Sheets

(51) Int. Cl.
*G02B 3/00* (2006.01)
*F21Y 115/10* (2016.01)
*F21Y 115/30* (2016.01)

BEAM SHAPING METHOD AND DEVICE EMPLOYING FULL-IMAGE TRANSFER FOR PLANAR LIGHT SOURCES

TECHNICAL FIELD

The disclosure relates to a beam shaping method for planar light sources, and also relates to a beam shaping device for planar light sources, belonging to the optical field.

BACKGROUND

In application fields such as high-power lasers and lighting, it is necessary to use multiple light-emitting devices to stitch large-sized light sources or integrate high-power light sources. However, due to limitations in light source packaging and other aspects, there are always certain gaps between multiple planar light sources in the same plane. In many applications, in order to achieve more uniform light intensity distribution, it is necessary to eliminate the influence of non-luminous gaps in primary light sources.

SUMMARY

A primary technical problem to be solved by the disclosure is to provide a beam shaping method employing full-image transfer for planar light sources.

Another technical problem to be solved by the disclosure is to provide a beam shaping device employing full-image transfer for planar light sources.

In order to achieve the above objects of the disclosure, the disclosure adopts the following technical solution:

Based on the first aspect of the examples provided by the disclosure, a beam shaping method employing full-image transfer for planar light sources is provided, including the following steps:

(1) using multiple first lenses to respectively magnify and image beams emitted by multiple planar light sources, so as to obtain magnified full images of the multiple planar light sources; and (2) stitching the magnified full images of the multiple planar light sources at a primary imaging position, so as to obtain a seamless light source.

Preferably, along any section of a primary optical axis, the distance u between each of the planar light sources and the first lens and the distance v between the first lens and the primary imaging position satisfy the following formulas simultaneously:

$$\frac{1}{f} = \frac{1}{u} + \frac{1}{v}; \frac{k}{h} = \frac{v}{u}; h + 2 \times u \times \tan\left(\frac{\theta}{2}\right) \leq D \leq k; k - h = d;$$

along any section of the primary optical axis, the size of the planar light source is h, the distance between adjacent light sources is d, and the size of the magnified full image of the planar light source at the primary imaging position is k; the full angle of the divergence angle of the planar light source is θ; and the diameter of the first lens is D, and the focal length of the first lens is f.

Preferably, the beam shaping method employing full-image transfer for planar light sources further includes the following step:

(3) using a second lens to reduce and image the beam of the seamless light source obtained in step (2), so as to obtain a reduced seamless full image.

Preferably, along any section of the primary optical axis, the distance u' between the primary imaging position and the second lens and the distance v' between the second lens and a secondary imaging position satisfy the following formulas simultaneously:

$$\frac{1}{f'} = \frac{1}{u'} + \frac{1}{v'}; \frac{m'}{m} = \frac{v'}{u'}; m + 2 \times u' \times \tan\left(\frac{\theta'}{2}\right) \leq D'; m > m';$$

along any section of the primary optical axis, the size of the seamless light source is m, and the size of the reduced full image of the seamless light source at the secondary imaging position is m'; the full angle of the divergence angle of the seamless light source is θ'; and the diameter of the second lens is D', and the focal length of the second lens is f'.

Preferably, the planar light sources used in step (1) are planar light sources that can be stitched after the beams are magnified in equal proportions.

Preferably, the shapes of the beams of the planar light sources used in step (1) are regular patterns that can be periodically and repeatedly arranged. For example, the shapes of the beams of the planar light sources used in step (1) are any one or more shapes of a square, a rectangle, an isosceles triangle, a regular triangle and a regular hexagon.

Preferably, the multiple planar light sources used in step (1) are LED light sources or VCSEL light sources simultaneously.

Based on the second aspect of the examples provided by the disclosure, a beam shaping device employing full-image transfer for planar light sources is provided, including:

a light source array composed of multiple planar light sources which are arranged in the same plane; and a lens group composed of multiple first lenses, wherein the multiple first lenses and the multiple planar light sources are coaxially arranged in a manner of one-to-one correspondence, and the multiple first lenses are respectively used for magnifying and imaging the beams emitted by the multiple planar light sources, so as to obtain magnified full images of the multiple planar light sources; and by means of the distances between the multiple first lenses and the multiple planar light sources, the magnified full images of the multiple planar light sources are seamlessly stitched at a primary imaging position, so that the magnified full images of the multiple planar light sources are stitched into a seamless light source at the primary imaging position.

Preferably, along any section of a primary optical axis, the distance u between each of the planar light sources and the first lens and the distance v between the first lens and the primary imaging position satisfy the following formulas simultaneously:

$$\frac{1}{f} = \frac{1}{u} + \frac{1}{v};$$

$$\frac{k}{h} = \frac{v}{u};$$

$$h + 2 \times u \times \tan\left(\frac{\theta}{2}\right) \leq D \leq k;$$

$$k - h = d;$$

along any section of the primary optical axis, the size of the planar light source is h, the distance between adjacent light sources is d, and the size of the magnified full image of the planar light source at the primary imaging position is k; the full angle of the divergence angle of the planar light source is θ; and the diameter of the first lens is D, and the focal length of the first lens is f.

Preferably, the beam shaping device employing full-image transfer for planar light sources further includes a second lens, the second lens and the center of the multiple planar light sources are coaxially arranged, the second lens is arranged on a light-emitting path of the seamless light source, and the second lens is used for reducing and imaging the beam emitted by the seamless light source, so as to obtain a reduced seamless full image.

Preferably, along any section of the primary optical axis, the distance u' between the primary imaging position and the second lens and the distance v' between the second lens and a secondary imaging position satisfy the following formulas simultaneously:

$$\frac{1}{f'} = \frac{1}{u'} + \frac{1}{v'};$$

$$\frac{m'}{m} = \frac{v'}{v};$$

$$m + 2 \times u' \times \tan\left(\frac{\theta'}{2}\right) \leq D;$$

$$m > m';$$

along any section of the primary optical axis, the size of the seamless light source is m, and the size of the reduced full image of the seamless light source at the secondary imaging position is m'; the full angle of the divergence angle of the seamless light source is θ'; and the diameter of the second lens is D', and the focal length of the second lens is f'.

Preferably, the multiple planar light sources are LED light sources or VCSEL light sources simultaneously. Preferably, the planar light sources are planar light sources that can be stitched after the beams are magnified in equal proportions.

Preferably, the shapes of the beams of the planar light sources are regular patterns that can be periodically and repeatedly arranged. For example, the shapes of the beams of the planar light sources are any one or more shapes of a square, a rectangle, an isosceles triangle, a regular triangle and a regular hexagon.

According to the beam shaping method employing full-image transfer for planar light sources provided by the disclosure, beams of multiple planar light sources are magnified and imaged respectively by multiple first lenses, so as to obtain magnified full images of the multiple planar light sources; and then, the magnified full images of the multiple planar light sources are seamlessly stitched at a primary imaging position, so as to obtain a seamless light source at the primary imaging position. The above-mentioned beam shaping method for planar light sources achieves the elimination of gaps between the light sources with almost no loss of optical power by means of full-image transfer and seamless stitching, thereby improving the beam quality of the light sources as a whole. This kind of optical shaping method is suitable for shaping and processing the planar light sources such as VCSEL and LED.

DETAILED DESCRIPTION

The following further describes the technical solutions of the disclosure with reference to the accompanying drawings and specific embodiments.

Figure 1:
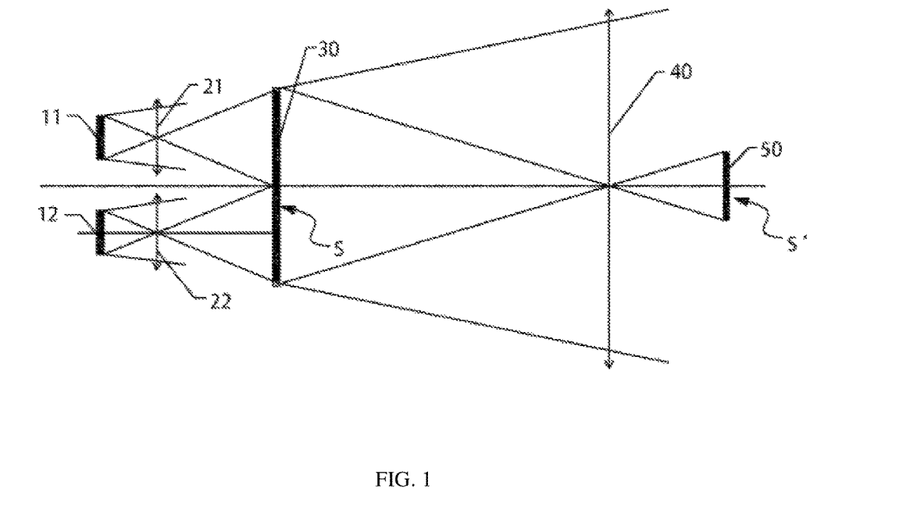
FIG. 1 is a schematic diagram of optical path principle of a beam shaping method employing full-image transfer for planar light sources provided by the disclosure.

As shown in FIG. 1, a beam shaping method employing full-image transfer for planar light sources provided by the disclosure includes the following steps:

(1) multiple first lenses (marked as 21, 22, 23, 24, . . . ) are used to respectively magnify and image beams emitted by multiple planar light sources (marked as 11, 12, 13, 14, . . . ), so as to obtain magnified full images (31, 32, 33, 34, . . . ) of the multiple planar light sources; and (2) the magnified full images (31, 32, 33, 34, . . . ) of the multiple planar light sources are stitched at a primary imaging position 30, so that the magnified full images (31, 32, 33, 34, . . . ) of the multiple planar light sources are stitched at a primary imaging position 30 to obtain a seamless light source S.

Figure 3:
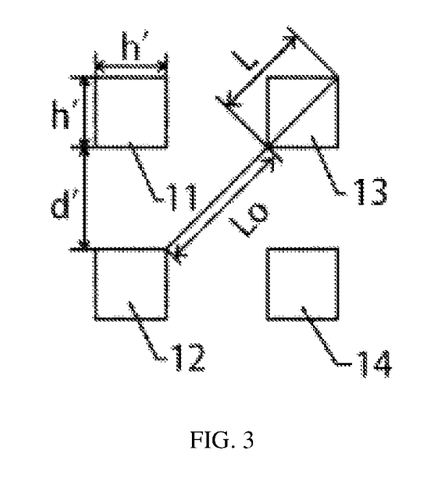
FIG. 3 is a schematic structural diagram of a 2×2 light source array.

The multiple planar light sources (11, 12, 13, 14, . . . ) as primary light sources may be LED light sources or VCSEL light sources simultaneously, and the multiple planar light sources may be chip arrays located on the same wafer or discrete chip arrays (for example, as shown in FIG. 3).

The primary light sources are planar light sources that can be stitched after the beams are magnified in equal proportions. The shapes and sizes of the multiple primary light sources may be the same, or may be different. The shapes of the beams of the primary light sources may be closed regular shapes, or closed irregular shapes composed of straight lines, curves, etc. The beams of multiple planar light sources for stitching only need to be stitched into a seamless plane after being magnified in equal proportions.

Preferably, regular patterns that can be periodically and repeatedly arranged are recommended for the shapes of the beams of the multiple planar light sources, so as to facilitate industrial production and selection of related lenses. The above-mentioned regular patterns may be repeatedly arranged along one, two or even more axes, and an included angle between different axes may be any angle. For example, planar light sources of which the shapes of beams are a square, a rectangle, an isosceles triangle, a regular triangle, a regular hexagon, a regular octagon, or the like may be used as the primary light sources. The shapes of the beams of multiple planar light sources for stitching may be one or more of the above-mentioned shapes.

The multiple planar light sources (11, 12, 13, 14, . . . ) form a light source array with a small size and a small spacing, and each of the planar light sources constitutes a unit light source. The unit light sources arranged in adjacent rows or adjacent columns may be arranged correspondingly or in a staggered way, as long as the beams can be stitched into a seamless plane after being magnified in equal proportions.

The multiple first lenses (21, 22, 23, 24, . . .) form a lens group 20, and each of the first lenses constitutes a unit lens. The multiple first lenses in the lens group 20 and the multiple planar light sources in the light source array are arranged in a manner of one-to-one correspondence. Each of the first lenses and the single planar light source are coaxially arranged, and each of the first lenses and the corresponding planar light source are arranged in parallel along the same primary optical axis. For example, a first lens 21 and a planar light source 11 are coaxially arranged, a first lens 22 and a planar light source 12 are coaxially arranged, a first lens 23 and a planar light source 13 are coaxially arranged, a first lens 24 and a planar light source 14 are coaxially arranged, and so on. Each of the first lenses is used for magnifying and imaging the beam emitted by the corresponding planar light source. For the selection of each of the first lenses, a clear aperture D of the first lens is required to fully cover all the divergent light of the corresponding unit light source, and an imaging size of the corresponding unit light source (that is, the size of a magnified full image formed after imaging) should not be less than a maximum cross section of the unit lens and the lens fixing device, thereby ensuring that multiple full images can be seamlessly stitched without mechanical size conflicts.

Figure 2:
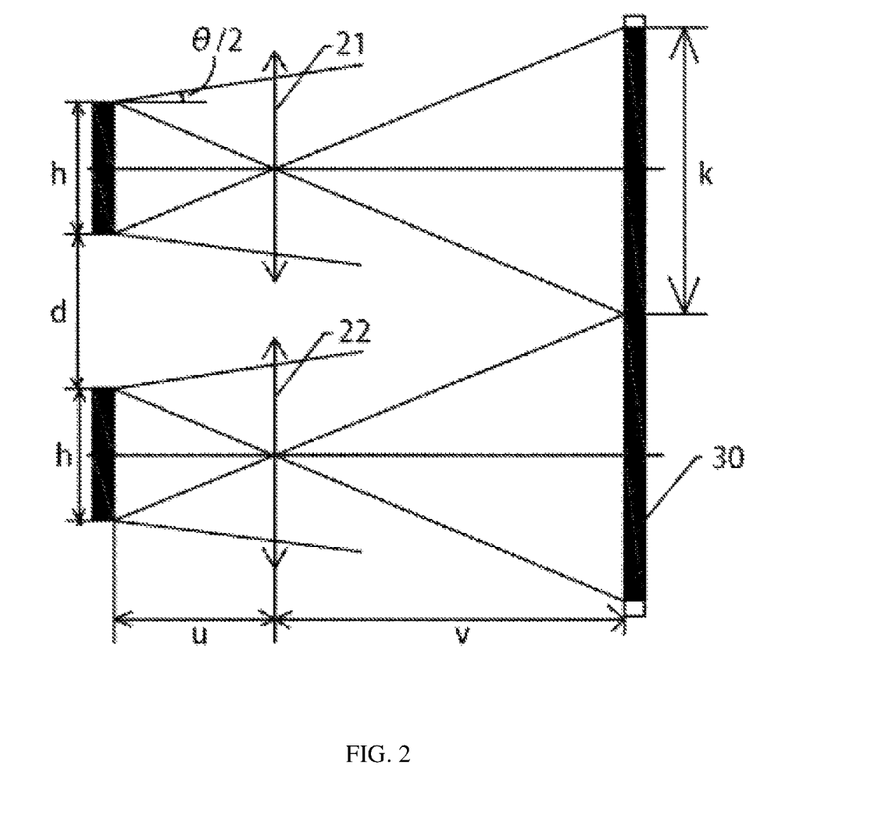
FIG. 2 is a schematic diagram of principle of obtaining magnified full images of multiple planar light sources.

As shown in FIG. 2, when the lens group 20 is used for magnifying and imaging the light source array, along any section of a primary optical axis, the distance u between each of the planar light sources and the first lens and the distance v between the first lens and the primary imaging position 30 satisfy the following formulas simultaneously:

$$\frac{1}{f} = \frac{1}{u} + \frac{1}{v}; \quad (1)$$

$$\frac{k}{h} = \frac{v}{u}; \quad (2)$$

$$h + 2 \times u \times \tan\left(\frac{\theta}{2}\right) \le D \le k; \quad (3)$$

$$k - h = d; \quad (4)$$

along any section of the primary optical axis, the size of the single planar light source is h, the distance between adjacent light sources is d, and the size of the magnified full image of the planar light source at the primary imaging position 30 is k; the full angle of the divergence angle of the planar light source is θ; and the diameter of the first lens is D, and the focal length of the first lens is f. All sizes of the planar light source obtained along any section of the primary optical axis and the size of the corresponding magnified full image satisfy the above-mentioned four formulas.

The image after the above-mentioned stitching may be regarded as an independent planar light source, and a lens may be used again for secondary imaging or other transformations.

Specifically, the beam shaping method for planar light sources may also include the following step: (3) a second lens 40 is used for reducing and imaging the seamless light source S obtained in step (2), so as to obtain a reduced seamless full image S', thereby obtaining a high-power seamless light source with a high energy density.

When the second lens 40 is used for reducing and imaging the seamless light source S, along any section of the primary optical axis, the distance u' between the primary imaging position 30 and the second lens 40 and the distance v' between the second lens 40 and a secondary imaging position 50 satisfy the following formulas simultaneously:

$$\frac{1}{f'} = \frac{1}{u'} + \frac{1}{v'}; \quad (5)$$

$$\frac{m'}{m} = \frac{v'}{v}; \quad (6)$$

$$m + 2 \times u' \times \tan\left(\frac{\theta'}{2}\right) \le D; \quad (7)$$

$$m > m'; \quad (8)$$

along any section of the primary optical axis, the size of the seamless light source S is m, and the size of the reduced full image S' of the seamless light source S at the secondary imaging position is m'; the full angle of the divergence angle of the seamless light source S is θ'; and the diameter of the second lens 40 is D', and the focal length of the second lens 40 is f'. All sizes of the seamless light source S obtained along any section of the primary optical axis and the size of the corresponding reduced full image satisfy the above-mentioned four formulas.

Figure 4:
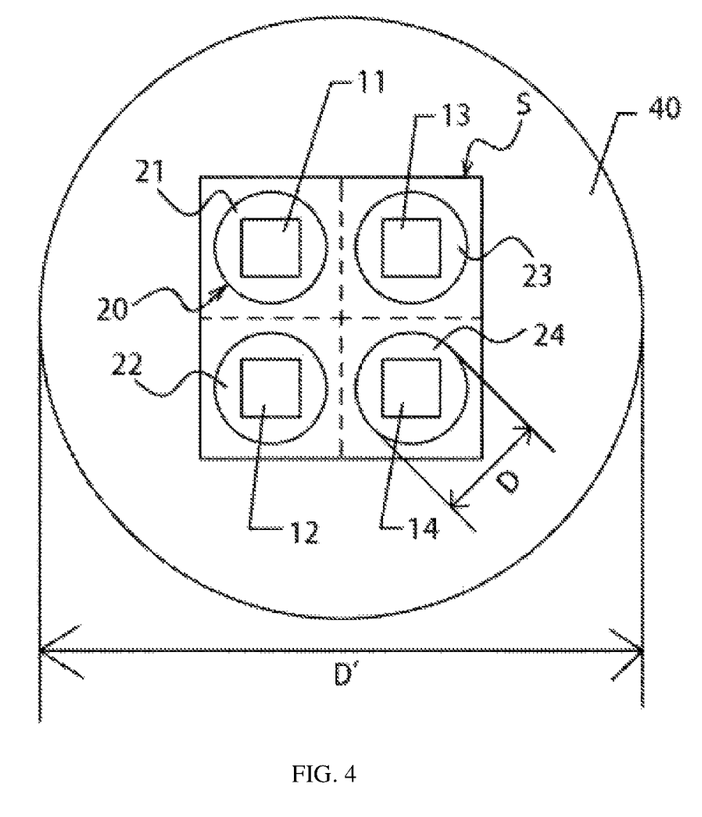
FIG. 4 is a front-view schematic structural diagram of a beam shaping device employing full-image transfer for planar light sources provided by the disclosure.
Figure 5:
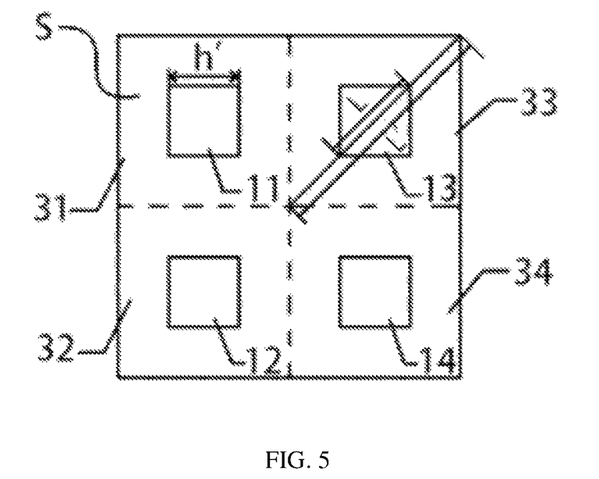
FIG. 5 is a schematic diagram of the light source array in FIG. 3 and a seamless light source obtained after magnifying and imaging the light source array.

The disclosure also provides a device for achieving the above-mentioned beam shaping method for planar light sources. As shown in FIG. 3 to FIG. 5, the beam shaping device employing full-image transfer for planar light sources provided by the disclosure includes:

a light source array composed of multiple planar light sources (11, 12, 13, 14, . . .), and the multiple planar light sources (11, 12, 13, 14, . . .) are arranged in the same plane; and a lens group 20 composed of multiple first lenses (21, 22, 23, 24, . . .), wherein the multiple first lenses and the multiple planar light sources are coaxially arranged in a manner of one-to-one correspondence, and the multiple first lenses (21, 22, 23, 24, . . .) are respectively used for magnifying and imaging the beams of the multiple planar light sources (11, 12, 13, 14, . . .), so as to obtain magnified full images (31, 32, 33, 34, . . .) of the multiple planar light sources; and by means of the distances between the multiple first lenses (21, 22, 23, 24, . . .) and the multiple planar light sources (11, 12, 13, 14, . . .), the magnified full images (31, 32, 33, 34, . . .) of the multiple planar light sources are seamlessly stitched at the primary imaging position 30, so as to obtain a seamless light source S at the primary imaging position 30.

Moreover, the device further includes a second lens 40, the second lens 40 and the center of the multiple planar light sources are coaxially arranged, the second lens and the center of the seamless light source S are also coaxially arranged, the second lens 40 is arranged on a light-emitting path of the seamless light source S, and the second lens 40 is used for reducing and imaging the beam emitted by the seamless light source S, so as to obtain a reduced seamless full image S'.

The multiple planar light sources (11, 12, 13, 14, . . .) as primary light sources may be LED light sources or VCSEL light sources simultaneously, and the multiple planar light sources may be chip arrays located on the same wafer or discrete chip arrays.

The primary light sources are planar light sources that can be stitched after the beams are magnified in equal proportions. The shapes and sizes of the multiple primary light sources may be the same, or may be different. The shapes of the primary light sources may be closed regular shapes, or closed irregular shapes composed of straight lines, curves, etc. The beams of multiple planar light sources for stitching only need to be stitched into a seamless plane after being magnified in equal proportions.

Preferably, regular patterns that can be periodically and repeatedly arranged are recommended for the shapes of the beams of the multiple planar light sources, so as to facilitate industrial production and selection of related lenses. The above-mentioned regular patterns may be repeatedly arranged along one, two or even more axes, and an included angle between different axes may be any angle. For example, planar light sources of which the shapes of beams are any one of a square, a rectangle, an isosceles triangle, a regular triangle, a regular hexagon, etc. can be used as the primary light sources.

The multiple planar light sources (11, 12, 13, 14, . . . ) form a light source array with a small size and a small spacing, and each of the planar light sources constitutes a unit light source. The unit light sources arranged in adjacent rows or columns may be arranged correspondingly or in a staggered way for stitching.

The multiple first lenses (21, 22, 23, 24, . . . ) form a lens group 20, and each of the first lenses constitutes a unit lens. The multiple first lenses in the lens group 20 and the multiple planar light sources in the light source array are arranged in a manner of one-to-one correspondence. Each of the first lenses and the single planar light source are arranged in parallel along the same primary optical axis. For example, a first lens 21 and a planar light source 11 are coaxially arranged, a first lens 22 and a planar light source 12 are coaxially arranged, a first lens 23 and a planar light source 13 are coaxially arranged, a first lens 24 and a planar light source 14 are coaxially arranged, and so on. Each of the first lenses is used for magnifying and imaging the beam emitted by the corresponding planar light source. For the selection of each of the first lenses, a clear aperture of the first lens is required to fully cover all the divergent light of the corresponding unit light source, and an imaging size of the corresponding unit light source should not be less than a maximum cross section of the unit lens and the lens fixing device, thereby ensuring that multiple full images can be seamlessly stitched without mechanical size conflicts.

As shown in FIG. 2, when the lens group 20 is used for magnifying and imaging the light source array, along any section of a primary optical axis, the distance u between each of the planar light sources and the first lens and the distance v between the first lens and the primary imaging position 30 satisfy the following formulas simultaneously:

$$\frac{1}{f} = \frac{1}{u} + \frac{1}{v};\qquad(1)$$

$$\frac{k}{h} = \frac{v}{u};\qquad(2)$$

$$h + 2\times u \times \tan\left(\frac{\theta}{2}\right) \le D \le k;\qquad(3)$$

$$k - h = d;\qquad(4)$$

along any section of the primary optical axis, the size of the single planar light source is h, the distance between adjacent light sources is d, and the size of the magnified full image of the planar light source at the primary imaging position 30 is k; the full angle of the divergence angle of the planar light source is θ; and the diameter of the first lens is D, and the focal length of the first lens is f. All sizes of the planar light source obtained along any section of the primary optical axis and the size of the corresponding magnified full image satisfy the above-mentioned four formulas.

When the second lens 40 is used for reducing and imaging the seamless light source S, along any section of the primary optical axis, the distance u' between the primary imaging position 30 and the second lens 40 and the distance v' between the second lens 40 and a secondary imaging position 50 satisfy the following formulas simultaneously:

$$\frac{1}{f'} = \frac{1}{u'} + \frac{1}{v'};\qquad(5)$$

$$\frac{m'}{m} = \frac{v'}{v};\qquad(6)$$

$$m + 2\times u' \times \tan\left(\frac{\theta'}{2}\right) \le D';\qquad(7)$$

$$m > m';\qquad(8)$$

along any section of the primary optical axis, the size of the seamless light source S is m, and the size of the reduced full image S' of the seamless light source at the secondary imaging position 50 is m'; the full angle of the divergence angle of the seamless light source S is θ'; and the diameter of the second lens 40 is D', and the focal length of the second lens 40 is f'. All sizes of the seamless light source obtained along any section of the primary optical axis and the size of the corresponding reduced full image satisfy the above-mentioned four formulas.

Hereinafter, with reference to FIG. 3 to FIG. 5, a 2×2 light source array composed of 4 square planar light sources (11, 12, 13, 14) is taken as an example to describe the corresponding beam shaping device for planar light sources in detail.

The 2×2 light source array shown in FIG. 3 is composed of 4 square planar light sources (11, 12, 13, 14), the planar light sources (11, 12, 13, 14) are LED light sources or VCSEL light sources simultaneously, and the 4 planar light sources may be chip arrays located on the same wafer or discrete chip arrays in the same plane. Primary light sources adopt a square structure to facilitate the stitching of images thereof. The 4 planar light sources (11, 12, 13, 14) form a 2×2 light source array with a size h' and a spacing d', and 4 unit light sources are arranged vertically and uniformly in the same plane in the shape of "囗". The shape of the beam of each of the planar light sources is a square, and a light-emitting area is h'×h'.

As shown in FIG. 4, 4 first lenses (21, 22, 23, 24) form a lens group 20, wherein the first lens 21 and the planar light source 11 are coaxially arranged, the first lens 22 and the planar light source 12 are coaxially arranged, the first lens 23 and the planar light source 13 are coaxially arranged, and the first lens 24 and the planar light source 14 are coaxially arranged. Each of the first lenses is used for magnifying and imaging the beam emitted by the corresponding planar light source. For the selection of each of the first lenses, a clear aperture D of the first lens is required to fully cover all the divergent light of the corresponding unit light source, and an imaging size of the corresponding unit light source should not be less than a maximum cross section of the unit lens and the lens fixing device, thereby ensuring that multiple full images can be seamlessly stitched without mechanical size conflicts.

For a planar light source array with a small size and a small spacing, such as VCSEL light sources which are regularly arranged, the lens group 20 may be made into a micro-lens array (fly-eye lens). The first lens in the lens group 20 may be a spherical convex lens, a non-spherical lens, a Fresnel lens, etc.

The primary imaging position 30, the second lens 40 and the secondary imaging position 50 are all arranged coaxially with the center line of the light source array. For the selection of the second lens 40, a clear aperture D' of the second lens is required to fully cover all the divergent light of the seamless light source S.

As shown in FIG. 3, for the light source array composed of 4 square planar light sources (11, 12, 13, 14), in all sizes obtained along any section of the primary optical axis, the size in a diagonal direction is the largest. Therefore, hereinafter, the sizes of the first lens and the second lens, the distance between the first lens and the primary imaging position 30, the distance between the primary imaging position 30 and the second lens 40, and the distance between the second lens 40 and the secondary imaging position 50 are calculated based on the size of the light source array in the diagonal direction.

Specifically, when the lens group 20 is used for magnifying and imaging the light source array, the distance u between each of the square planar light sources and the first lens and the distance v between the first lens and the primary imaging position 20 satisfy the following formulas simultaneously:

$$\frac{1}{f} = \frac{1}{u} + \frac{1}{v}; \quad (1)$$

$$\frac{L'}{L} = \frac{v}{u}; \quad (9)$$

$$L + 2 \times u \times \tan\left(\frac{\theta}{2}\right) \leq D \leq L'; \quad (10)$$

$$L' - L = L0; \quad (11)$$

the side length of the square planar light source is h', the diagonal length is L, the distance between adjacent light sources on the diagonal is L0, and the diagonal size of the magnified full image of the square planar light source at the primary imaging position 30 is L'; the full angle of the divergence angle of the planar light source is θ; and the diameter of the first lens is D, and the focal length of the first lens is f.

At the primary imaging position 30, the size of the seamless light source S along the diagonal direction of the light source array, that is, the original size of the seamless light source S is m, wherein m=2×L'. (12)

When the second lens 40 is used for reducing and imaging the seamless light source S, the distance u' between the primary imaging position 30 and the second lens 40 and the distance v' between the second lens 40 and the secondary imaging position 50 satisfy the following formulas simultaneously:

$$\frac{1}{f'} = \frac{1}{u'} + \frac{1}{v'}; \quad (5)$$

$$\frac{m'}{m} = \frac{v'}{v}; \quad (6)$$

$$m + 2 \times u' \times \tan\left(\frac{\theta'}{2}\right) \leq D; \quad (7)$$

$$m > m'; \quad (8)$$

along any section of the primary optical axis, the size of the seamless light source S is m, and the size of the reduced full image S' of the seamless light source at the secondary imaging position is m'; the full angle of the divergence angle of the seamless light source S is θ'; and the diameter of the second lens 40 is D', and the focal length of the second lens is f'.

For the light source array shown in FIG. 3, since the primary light source is composed of 4 square light sources, the gaps between the 4 light sources cannot be eliminated by using a single spherical lens or a single spherical reflector. In the beam shaping device for planar light sources provided by the disclosure, 4 first lenses (that is, the lens group 20) are used for respectively magnifying 4 unit light sources to obtain full images. Then, the magnified full images of the 4 unit light sources are stitched at the primary imaging position 30, so that a seamlessly stitched full image S can be obtained from 4 planar light sources with seams. As shown in FIG. 5, 4 unit light sources are planar light sources 11, 12, 13 and 14 respectively and are magnified and imaged to obtain magnified full images 31, 32, 33 and 34 of the 4 unit light sources. By adjusting the setting distance between the light source array and the lens group 20, the magnified full images 31, 32, 33 and 34 of the 4 unit light sources can be seamlessly stitched at the primary imaging position 30, so as to obtain a seamless light source S as shown in FIG. 5. In FIG. 5, for ease of understanding, the stitching boundaries of the magnified full images of the 4 unit light sources are shown with dotted lines. However, in the actual seamless light source S, by adjusting the distances between the multiple planar light sources and the lens group 20, the 4 magnified full images are seamlessly stitched at the primary imaging position 30 to form a whole, and therefore, there is no visible boundary as shown in the figure. The above-mentioned 4 magnified full images can be regarded as a uniform seamless light source S, and thus, subsequent imaging transformations can be performed again. For example, a second lens 40 with a larger aperture can be used for secondarily reducing and imaging (fully imaging) the full image, so as to obtain a reduced seamless full image S'.

In order to evaluate the influence of the above-mentioned beam shaping method on the beam quality, the disclosure uses the beam parameter product (BPP) to evaluate the beam quality of the primary light source and the magnified seamless full image, wherein BPP=beam waist radius×far-field divergence angle.

Taking a 2×2 light source array composed of 4 square planar light sources as an example, the beam quality of the primary light source and the seamless light source S obtained after stitching the magnified full images is evaluated. For the light source array composed of 4 square planar light sources (11, 12, 13, 14), in all sizes obtained along any section of the primary optical axis, the size in a diagonal direction is the largest. Therefore, the beam quality is evaluated based on the size of the light source array in the diagonal direction.

The side length of the square planar light source is h', and the light-emitting area of the planar light source is h'×h'; the diagonal length of the square planar light source is L, and the distance between adjacent light sources in the diagonal direction is L0; and the full angle of the divergence angle of the planar light source is θ.

Assuming that the unit planar light source is a Gaussian beam, according to the transmission characteristics of the Gaussian beam, the beam parameter product of the unit light source remains basically unchanged when passing through a thin lens. The beam waist here is approximated by the size of the primary light source; and the far-field divergence angle is approximated by the full angle θ of the divergence angle of the primary light source.

The primary light sources are considered as a whole, and the beam parameter product in the diagonal direction is $$BPP_0 = (L + L0 + L) \times \frac{\theta}{2} = \left(L + \frac{L0}{2}\right) \times \theta.$$

In the stitched full image S, the beam parameter product of each unit image in the diagonal direction BPP1=the beam parameter product of the unit light source $$BPP_2 = L \times \frac{\theta}{2}.$$

Therefore, the beam parameter product of the stitched full image in a vertical direction is $$BPP' = 2 \times \left(\frac{L\theta}{2}\right) = L\theta,$$

which is smaller than the overall beam parameter product of the primary light source $BPP_0$.

It can be seen that this beam shaping method not only eliminates the gaps in light sources, but also eliminates the interference of the gaps on the beam quality, and improves the overall beam quality to facilitate those application scenes that require high beam quality.

The above only takes the 2×2 square light source array as an example to compare the beam quality of the seamless light source obtained after full-image transfer and seamless stitching with the beam quality of the primary light source. The above evaluation method can also be understood as the evaluation of the beam quality of the light source array with two light sources along any section of the primary optical axis. It can be concluded that the above-mentioned beam shaping method not only eliminates the gaps in light sources, but also eliminates the interference of the gaps on the beam quality, and improves the overall beam quality to facilitate those application scenes that require high beam quality. For a light source array composed of more than 4 planar light sources, the same conclusion can also be obtained, which is not repeated here.

Figure 6:
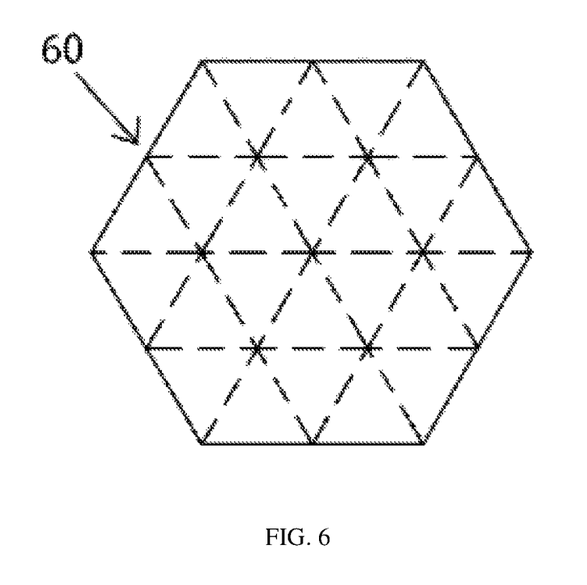
FIG. 6 is a schematic diagram of a seamless light source obtained after stitching in another example.

In other words, the beam shaping method and device employing full-image transfer for planar light sources provided by the disclosure can also be used for more planar light sources of which the shapes of beams can be stitched into a plane after being magnified in equal proportions. For example, FIG. 6 shows a schematic structural diagram of a seamless light source 60 obtained by stitching magnified full images of multiple planar light sources in the shape of a regular triangle. For ease of understanding, the stitching boundaries of the magnified full images of the multiple unit light sources are shown with dotted lines. However, in the actual seamless light source 60, by adjusting the distance between the lens group 20 and the primary imaging position 30, the multiple magnified full images are seamlessly stitched to form a whole, and therefore, there is no visible boundary as shown in the figure. For planar light sources in other shapes that can be stitched after being magnified in equal proportions, the principles of full-image transfer and seamless stitching are similar to those in the above-mentioned example and are not described in detail here.

In conclusion, according to the beam shaping method employing full-image transfer for planar light sources provided by the disclosure, beams of multiple planar light sources are magnified and imaged respectively by multiple first lenses, so as to obtain magnified full images of the multiple planar light sources; and then, the magnified full images of the multiple planar light sources are stitched, so as to obtain a seamless light source at the primary imaging position. The above-mentioned beam shaping method for planar light sources achieves the elimination of gaps between the light sources with almost no loss of optical power by means of full-image transfer and seamless stitching, thereby improving the beam quality of the light sources as a whole. This kind of optical shaping method is suitable for shaping and processing the planar light sources such as VCSEL and LED.

The beam shaping method and device employing full-image transfer for planar light sources provided by the disclosure are described in detail above. Any obvious modification made on the disclosure by a person of ordinary skill in the art without departing from the essence of the disclosure will constitute a patent infringement of the disclosure, and the person of ordinary skill in the art is to undertake corresponding legal liability.

What is claimed is:

1. A beam shaping method employing full-image transfer for planar light sources, comprising the following steps:
   (1) using multiple first lenses to respectively magnify and image beams emitted by multiple planar light sources, so as to obtain magnified full images of the multiple planar light sources; and
   (2) stitching the magnified full images of the multiple planar light sources at a primary imaging position, so as to obtain a seamless light source; wherein along any section of a primary optical axis, the distance u between each of the planar light sources and the first lens and the distance v between the first lens and the primary imaging position satisfy the following formulas simultaneously:

$$\frac{1}{f} = \frac{1}{u} + \frac{1}{v};$$

$$\frac{k}{h} = \frac{v}{u};$$

$$h + 2 \times u \times \tan\left(\frac{\theta}{2}\right) \leq D \leq k;$$

$$k - h = d;$$

along any section of the primary optical axis, the size of the planar light source is h, the distance between adjacent light sources is d, and the size of the magnified full image of the planar light source at the primary imaging position is k; the full angle of the divergence angle of the planar light source is θ; and the diameter of the first lens is D, and the focal length of the first lens is f.

2. The beam shaping method for planar light sources according to claim 1, further comprising the following step:
    (3) using a second lens to reduce and image the beam of the seamless light source obtained in step (2), so as to obtain a reduced seamless full image.

3. The beam shaping method for planar light sources according to claim 2, wherein
    along any section of the primary optical axis, the distance u' between the primary imaging position and the second lens and the distance v' between the second lens and a secondary imaging position satisfy the following formulas simultaneously:

$$\frac{1}{f'} = \frac{1}{u'} + \frac{1}{v'};$$

$$\frac{m'}{m} = \frac{v'}{v};$$

$$m + 2 \times u' \times \tan\left(\frac{\theta'}{2}\right) \leq D;$$

$$m > m';$$

along any section of the primary optical axis, the size of the seamless light source is m, and the size of the reduced full image of the seamless light source at the secondary imaging position is m'; the full angle of the divergence angle of the seamless light source is θ'; and the diameter of the second lens is D', and the focal length of the second lens is f'.

4. The beam shaping method for planar light sources according to claim 1, wherein
    the planar light sources used in step (1) are planar light sources that can be stitched after the beams are magnified in equal proportions.

5. The beam shaping method for planar light sources according to claim 4, wherein
    the shapes of the beams of the planar light sources used in step (1) are regular patterns that can be periodically and repeatedly arranged.

6. The beam shaping method for planar light sources according to claim 4, wherein
    the shapes of the beams of the multiple planar light sources used in step (1) are any one or more shapes of a square, a rectangle, an isosceles triangle, a regular triangle and a regular hexagon.

7. The beam shaping method for planar light sources according to claim 1, wherein the multiple planar light sources used in step (1) are LED light sources or VCSEL light sources simultaneously.

8. A beam shaping device employing full-image transfer for planar light sources, comprising:
    a light source array composed of multiple planar light sources which are arranged in the same plane; and
    a lens group composed of multiple first lenses, wherein the multiple first lenses and the multiple planar light sources are coaxially arranged in a manner of one-to-one correspondence, and the multiple first lenses are respectively used for magnifying and imaging the beams emitted by the multiple planar light sources, so as to obtain magnified full images of the multiple planar light sources; and by means of the distances between the multiple first lenses and the multiple planar light sources, the magnified full images of the multiple planar light sources are seamlessly stitched at a primary imaging position, so that the magnified full images of the multiple planar light sources are stitched into a seamless light source at the primary imaging position; wherein along any section of a primary optical axis, the distance u between each of the planar light sources and the first lens and the distance v between the first lens and the primary imaging position satisfy the following formulas simultaneously:

$$1/f=1/u+1/v;$$

$$k/h=v/u;$$

$$h+2\times u\times\tan(\theta/2)\leq D\leq k;$$

$$k-h=d;$$

along any section of the primary optical axis, the size of the planar light source is h, the distance between adjacent light sources is d, and the size of the magnified full image of the planar light source at the primary imaging position is k; the full angle of the divergence angle of the planar light source is θ; and the diameter of the first lens is D, and the focal length of the first lens is f.

9. The beam shaping device for planar light sources according to claim 8, further comprising: a second lens, wherein the second lens and the center of the multiple planar light sources are coaxially arranged, the second lens is arranged on a light-emitting path of the seamless light source, and the second lens is used for reducing and imaging the beam emitted by the seamless light source, so as to obtain a reduced seamless full image.

10. The beam shaping device for planar light sources according to claim 9, wherein along any section of the primary optical axis, the distance u' between the primary imaging position and the second lens and the distance v' between the second lens and a secondary imaging position satisfy the following formulas simultaneously:

$$1/f'=1/u'+1/v';$$

$$m'/m=v'/u';$$

$$m+2\times u'\times\tan(\theta'/2)\leq D';$$

$$m>m';$$

along any section of the primary optical axis, the size of the seamless light source is m, and the size of the reduced full image of the seamless light source at the secondary imaging position is m'; the full angle of the divergence angle of the seamless light source is 0'; and the diameter of the second lens is D', and the focal length of the second lens is f.

11. The beam shaping device for planar light sources according to claim 8, wherein the multiple planar light sources are LED light sources or VCSEL light sources simultaneously.

12. The beam shaping device for planar light sources according to claim 8, wherein the planar light sources are planar light sources that can be stitched after the beams are magnified in equal proportions.

13. The beam shaping device for planar light sources according to claim 12, wherein the shapes of the beams of the planar light sources are regular patterns that can be periodically and repeatedly arranged.

14. The beam shaping device for planar light sources according to claim 12, wherein the shapes of the beams of the multiple planar light sources are any one or more shapes of a square, a rectangle, an isosceles triangle, a regular triangle and a regular hexagon.

\* \* \* \* \*